United States Patent

Hemmerich et al.

Patent Number: 5,611,208
Date of Patent: Mar. 18, 1997

[54] MODIFIED CRYOGENIC DIFFUSION PUMP

[75] Inventors: Johann L. Hemmerich, Oxford; Paul Milverton, Harwell, both of United Kingdom

[73] Assignee: European Atomic Energy Community, Luxembourg

[21] Appl. No.: 545,578

[22] PCT Filed: May 13, 1994

[86] PCT No.: PCT/EP94/01637

§ 371 Date: Nov. 20, 1995

§ 102(e) Date: Nov. 20, 1995

[87] PCT Pub. No.: WO94/28314

PCT Pub. Date: Dec. 8, 1994

[30] Foreign Application Priority Data

May 20, 1993 [GB] United Kingdom ............... 93104651

[51] Int. Cl.⁶ ...................................................... B01D 8/00
[52] U.S. Cl. .............................. 62/55.5; 165/4; 417/901
[58] Field of Search ............................. 62/55.5; 165/4; 417/901

[56] References Cited

U.S. PATENT DOCUMENTS

| | | | |
|---|---|---|---|
| 2,831,549 | 4/1958 | Alpert | 62/55.5 |
| 3,339,627 | 9/1967 | Van Geuns et al. | 165/4 |
| 3,552,485 | 1/1971 | Le Jannou | 62/55.5 |
| 3,692,095 | 9/1972 | Fleming | 165/4 |
| 4,866,943 | 9/1989 | Purcell et al. | 165/4 |
| 4,907,413 | 3/1990 | Clarkson et al. | 62/55.5 |

FOREIGN PATENT DOCUMENTS

| | | | |
|---|---|---|---|
| 0007985 | 1/1987 | Japan | 62/55.5 |
| 706574 | 12/1979 | U.S.S.R. | |
| 1268827 | 11/1986 | U.S.S.R. | 62/55.5 |

OTHER PUBLICATIONS

Hemmerich, *J. Vac. Sci. Technol.*, XP000117290.
Hemmerich, *J. Vac. Sci. Technol.*
Patent Abstracts of Japan, vol. 10, No. 378 (M–546) (2435), Dec. 17, 1986.
Hemmerich, *Fusion Technology*, XP000271843.

*Primary Examiner*—Ronald C. Capossela
*Attorney, Agent, or Firm*—Bacon & Thomas

[57] ABSTRACT

The present invention relates to a pumping device which is suitable for pumping mixtures of gases at cryogenic temperatures which is a combination of a cryogenic diffusion pump and a thermal gradient barrier diffusion pump. Specifically, the pumping device comprises an elongate body of material capable of withstanding cryogenic temperatures and of sustaining an axial temperature gradient in use. The elongate body has an inlet for the gas mixture and an outlet for one or more gases to be pumped, wherein the outlet is filled with a porous barrier through which gases must pass to exit the device. The porous body has a heating means disposed at its outlet side.

16 Claims, 1 Drawing Sheet

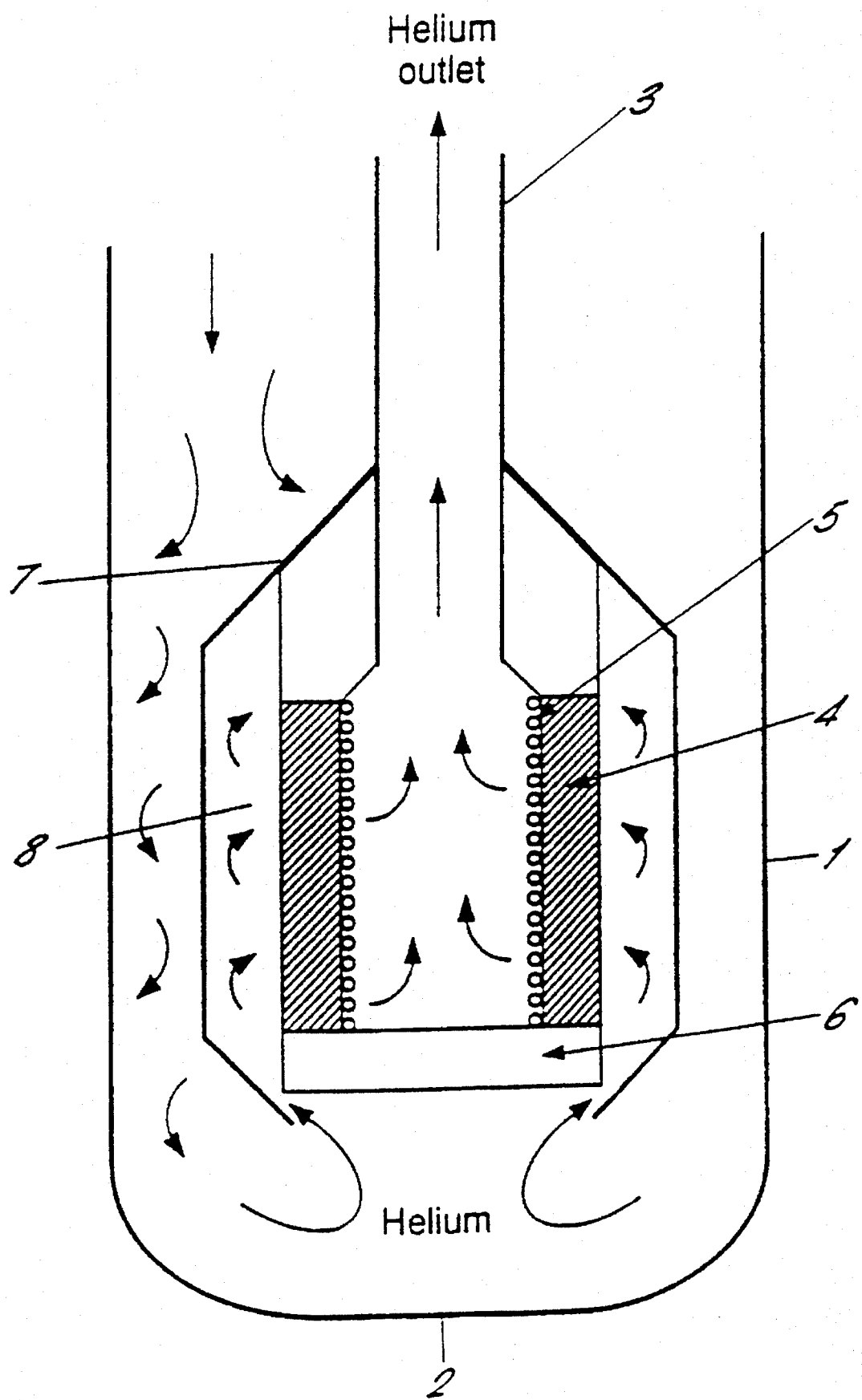

MODIFIED CRYOGENIC DIFFUSION PUMP

The invention relates to cryopumps and in particular to a pumping device of the cryogenic diffusion type in which the pumping function is boosted by the addition of a thermal gradient barrier diffusion pump.

A cryogenic diffusion pump is a device which can pump and to a certain extent, separate mixtures of gases at cryogenic temperatures.

Known pumps such as those described in J. Vac. Sci. Technol. A8(1) Jan/Feb (1990) 141–144 and Fusion Technology 21 March (1992) 276–281 usually consist of a vertical "dipstick" or "finger" cold trap in which the inner wall has an axial thermal gradient between the top (hot) and the bottom (cold) of the finger. Other shapes and arrangements for the pump are however possible.

The principle of the pump is that as a mixture of gases enters the cold trap the mixture thermally accommodates to the pump wall. As this happens the gas density increases and the mean free path of the individual gas molecules decreases accordingly so that the constituents are eventually pumped by cryocondensation, i.e. forming a frost layer on the cold wall depending on temperature and the respective vapour pressure characteristics of the gases.

It is possible however, using the pump, to effect a separation of one or more gases in the mixture from the others by setting the temperature of the walls such that one or more components of the mixture do not freeze out on the pump walls but remain in the gas phase. These can then leave the pump by a return tube or other outlet at a pressure close to (up to 80%) the total pressure of the mixture at the pumps inlet.

A particular advantage of cryogenic diffusion pumps is that they can pump gases at very low pressures.

One application for which the cryogenic diffusion pump has proved useful is pumping the exhaust gases from a thermonuclear fusion reactor. The exhaust contains mixtures of hydrogen isotopes $H_2$, $D_2$ and $T_2$ including heteromolecular species such as HT and DT and helium isotopes $^4$He and $^3$He. $^4$He is a reaction product of the fusion reaction and must be removed in order to keep the α-particle concentration in the burning plasma below 5 to 10%. This results in a partial pressure of helium in the effluent gas of about 2 to 4%.

If a cryogenic diffusion pump is used to pump the exhaust gases from a fusion reactor the cold end of the gradient should be about 4° K. and the warmer end about 77° K. At these temperatures the hydrogen isotopes and other impurities condense onto the pump wall but helium remains in the gaseous phase and will be driven to the pump exit.

As mentioned before the pressure of gas at the pump outlet is dependant on the inlet pressure and there is usually a pressure drop of about 20% between the inlet and the outlet. A particular problem encountered in pumping exhaust gases from a fusion reactor is the relatively low pressure of said gases and the simultaneously high flow rate (e.g. typically a pressure of 0.1 Pa and a volume flow rate of 1000 $m^3s^{-1}$) such that the gases leaving the outlet of the cryogenic diffusion pump cannot be further pumped or compressed by presently commercially available conventional pumps (such as turbomolecular and/or positive displacement pumps). Such pumps of large size to deal with the low pressures and high mass flow rates would have to be specially constructed.

Thus the present inventors have developed a modified cryogenic diffusion pump which contains an additional pumping means which acts to boost the outlet pressure. It has been discovered that the outlet pressure of the cryogenic diffusion pump can be satisfactorily boosted if it is combined with a thermal gradient barrier diffusion pump. This raises the gas pressure to a level where commercially available pump sizes are sufficient for further compression of the gas to atmospheric pressure.

Thermal gradient barrier diffusion pumps are known from J. Vac. Sci. Technol A6(1) Jan/Feb 1988 pages 148–149. The working principle of such a pump is based on thermal transpiration or the "Knudsen" effect. In a porous barrier subjected to a temperature gradient, gas molecules under molecular flow conditions preferentially diffuse toward the heated side of the barrier having the effect that the pressures on either side are different i.e.

$$\frac{P_{HOT}}{P_{COLD}} = \sqrt{\frac{T_{HOT}}{T_{COLD}}}$$

where $P_{COLD}$ and $T_{COLD}$ are the pressure and temperature at the cold side of the barrier and $P_{HOT}$ and $T_{HOT}$ the pressure and temperature at the hot side of the barrier. From the equation it follows that particularly high compression ratios may be obtained, when $T_{COLD}$ is very low.

By the use of liquid helium refrigerators it is possible to achieve cryogenic temperatures such as $T_{COLD}=4°$ K. Thus a compression ratio of 5 may be achieved when the barrier is subjected to a temperature $T_{COLD}=4°$ K. on one side and $T_{HOT}=100°$ K. on the other side.

Thermal gradient barrier diffusion pumps have hitherto duly been tested at elevated temperatures (300°–1200° K.) but their combination with another pump of the cryogenic diffusion type has not been considered.

Thus a device for pumping a mixture of gases at cryogenic temperatures in accordance with the invention comprises an elongate body of material capable of withstanding cryogenic temperatures and of sustaining an axial temperature gradient in use, said body having an inlet for the gas mixture and an outlet for one or more gases to be pumped characterised in that said outlet is fitted with a porous barrier through which gases must pass to exit the device, said porous barrier having a heating means disposed at its outlet side.

By cryogenic temperatures is meant temperatures below room temperature but more particularly temperatures of 200° K. and below.

Preferably the elongate body is tubular in shape and more preferably closed at one end to form a "finger" or "dipstick". A return tube is then provided in the finger so that gases can be carried to the outlet of the device. Preferably the elongate body is vertically disposed with the closed end at the bottom.

In operation of the device the inside surface of the elongate body must be cooled and an axial temperature gradient generated, the cold end of the gradient usually being at the bottom end of the body. For this purpose the device may be provided with cooling means. In a preferred embodiment the elongate body may consist of a double wall having a cooling coil fitted in the inner space.

Suitable materials for the elongate body which can withstand cryogenic temperatures are metals of low thermal conductivity such as austenitic stainless steels, ceramic materials and plastics materials such as polyethylene and PTFE.

The porous barrier which forms part of the thermal gradient barrier diffusion pump is preferably of tubular shape and where a gas return tube is provided, may be fitted to the lower end of the tube with the heating means on the inner surface of the barrier.

Selection of a barrier of the correct material, size and construction is important for maximum efficiency of the device. The pores or channels in the barrier should be dimensioned to match the requirements of the particular molecular flow conditions. In particular the most suitable pore size depends on the operating pressure of any given process. The pore size should be smaller than the mean free path of the gas and the mean free path is inversely proportional to the pressure. Thus the higher the pressure the smaller the pore size required. For example at atmospheric pressure a barrier of pore size of 0.1 μm or less would be suitable. A porous ceramic material can fulfil this requirement. Alternatively a wire cage containing a powdered filler such as compressed diatomaceous earth can be used.

At medium pressures (e.g. about 1 KPa) a woven or non-woven ceramic fabric of matched mesh size is a suitable material for the barrier because it can provide an intermediate pore size (e.g. 10 μm) for optimum throughput.

At very low pressures e.g. less than 1 Pascal, pore sizes as big as 1 mm may be required. In this case it is possible to produce a barrier by mechanically machining a suitable material. Such a barrier may consist of discrete assemblies of channels or capillaries such as stacks or discs of alternating flat and wavy patterns. Preferably these channels, capillaries or wavy patterns are arranged in such a way that direct optical lines of view from the hot to the cold side of the barrier are avoided in order to minimise power losses by radiative heat transfer.

In all the above examples the suitable pore sizes given are those required for pumping gases at room temperature. However since the mean free path of the gas molecules is proportional to the temperature at constant pressure, appropriate pore sizes can be calculated for pumping at cryogenic temperatures. For example at 4° K. the pore size will need to be about 75 times smaller than at 300° K.

In a further embodiment of the invention the pumping speed of the barrier may be optimised by increasing gradually or in a stepwise manner, the pore size from the cold side to the hot side so that the ratio of the pore size to the mean free path of the gas molecules remains approximately constant.

For example, ideally a barrier working between 1 Pascal at 4° K. and 1 or 5 Pascal at 100° K. has a pore size of about 13 μm at the "cold side" and about 325 or 65 μm respectively on the "hot side". Such a barrier design achieves about twice the pumping speed per unit area as a barrier with a pore size of 13 μm throughout. Thus it need be only half the size.

In order to minimise power consumption by conductive heat transfer from the hot to the cold side of the barrier it is preferable that the barrier be made from a material of fairly low thermal conductivity e.g. $5Wm^{-1}K^{-1}$ or less. The various barrier materials described above can meet the requirement.

The invention will now be described by way of example with reference to FIG. 1 which is a vertical cross-section of a pumping device in accordance with the invention.

The device comprises a vertically disposed elongate body (1) which is closed at the bottom end (2). A return tube (3) depends down into the body (1) and has fitted to the end a tubular porous barrier (4). A heating coil (5) is wound around the inner surface of the barrier (4) and the top and bottom of the entire barrier/return tube assembly is closed by a thermally insulating member (6). A hood (7) is fitted to the return tube (3) above the point of attachment of the barrier (4) and extends downwards around the barrier (4) so as to provide a circular passage (8) for the gas to approach the inlet side of the barrier.

In the case where the pumping device is used to pump waste gas mixtures from a fusion reactor containing helium the outer surface of the body (4), the hood (7), the outer tube (1) and the return tube (3) are cooled to 4° K. at the bottom end and to about 77° K. at the upper end (not shown) by a cooling means (also not shown).

The gas mixture enters at the top of the body (1) and passes towards the bottom. In the process the hydrogen isotopes and other impurities accommodate to the cold surfaces of the body (1) and tube (3) and solidify there leaving helium alone in the gaseous phase. The helium travels to the bottom of the body (1) and then up through the circular passage (8) as shown by the arrows. The heater (5) on the inner side of the porous barrier (4) generates a thermal gradient between one surface and the other which causes the helium to diffuse preferentially through the barrier (4) to the heated side in accordance with the Knudsen effect. The effect therefore is to preferentially pump helium from the body (1) increasing its pressure so that it can then be processed by a conventional equipment.

We claim:

1. An apparatus for pumping mixtures of gases including helium at cryogenic temperatures comprising an elongated body (1) of a material capable of withstanding cryogenic temperatures and of sustaining an axial temperature gradient in use, said body having an inlet for the gas mixture and an outlet (3) for pumping helium, characterised in that said outlet (3) is fitted with a porous barrier (4) through which helium must pass to exit the apparatus said porous barrier (4) having a heating means (5) disposed at its outlet side.

2. A device as claimed in claim 1 wherein the elongate body (1) is tubular in shape.

3. A device as claimed in claim 2 wherein the elongate body (1) is closed at the end opposite to the gas inlet and includes a return tube (3) to carry the said one or more gases to the pump outlet.

4. A device as claimed in claim 3 wherein said elongate body (1) is vertically disposed with the closed end at the bottom (2).

5. A device as claimed in claim 4 wherein the porous barrier (4) is fitted at the lower end of the return tube (3).

6. A device as claimed in claim 1 which includes means for cooling the inside surface of the said elongate body and generating a temperature gradient along the longitudinal axis.

7. A device as claimed in claim 1 wherein the porous barrier (4) is of tubular shape.

8. A device as claimed in claim 1 wherein the barrier (4) is made of a material having a thermal conductivity of $5Wm^{-1}K^{-1}$ or less.

9. A device as claimed in claim 8 wherein the porous barrier (4) is made of a ceramic material.

10. A device as claimed in claim 9 wherein the porous barrier (4) is a woven or non-woven ceramic fabric of matched mesh size.

11. A device as claimed in claim 9 wherein the porous barrier (4) consists of discrete assemblies of channels or capillaries.

12. A device as claimed in claim 11 wherein said discrete assemblies consists of discs of alternating flat and wavy patterns which are arranged such that direct optical limes of view from the hot side to the cold side of the barrier (4) are avoided.

13. A device as claimed in claim 8 wherein the porous barrier (4) consists of discrete assemblies of channels or capillaries.

14. A device as claimed in claim 13 wherein said discrete assemblies consist of discs of alternating flat and wavy patterns which are arranged such that direct optical lines of view from the hot side to the cold side of the barrier (4) are avoided.

15. A device as claimed in claim 1 wherein the pore size in said barrier (4) is gradually increased from the cold side to the hot side.

16. A method of isolating and pumping helium at cryogenic temperatures from a mixture of gases using a device comprising an elongate body of material capable of withstanding cryogenic temperatures and of sustaining an axial temperature gradient in use, said body having an inlet for the gas mixture and an outlet for the helium to be pumped, the outlet being fitted with a porous barrier through which helium must pass to exit the device, the porous barrier having a heating means disposed on its outlet side, which method comprises cooling the inside surface of said elongate body using cooling means, heating the porous barrier using the heating means disposed on the outlet side of said porous barrier, introducing the mixture of gases to said elongate body, such that condensable gases comprising the gas mixture to be pumped condense on surfaces along the longitudinal axis of said elongate body at the appropriate temperatures in the temperature gradient maintained along the axis of said elongate body with the exception of helium gas, which is finally further compressed by the thermodynamic Knudsen effect by means of the temperature gradient maintained across the porous barrier.

* * * * *